(12) United States Patent
Kodaka et al.

(10) Patent No.: US 8,171,465 B2
(45) Date of Patent: May 1, 2012

(54) APPLICABLE PATCH SELECTION DEVICE AND APPLICABLE PATCH SELECTION METHOD

(75) Inventors: Nobuko Kodaka, Kawasaki (JP); Takahiro Urushidani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 12/197,026

(22) Filed: Aug. 22, 2008

(65) Prior Publication Data

US 2008/0313626 A1 Dec. 18, 2008

Related U.S. Application Data

(63) Continuation of application No. PCT/JP2006/304742, filed on Mar. 10, 2006.

(51) Int. Cl.
*G06F 9/44* (2006.01)

(52) U.S. Cl. ........ 717/168; 717/169; 717/171; 717/172; 717/173

(58) Field of Classification Search .................. 717/168, 717/169, 171, 172, 173
See application file for complete search history.

(56) References Cited

U.S. PATENT DOCUMENTS

| 2002/0184619 A1 | 12/2002 | Meyerson |
| 2004/0210653 A1* | 10/2004 | Kanoor et al. ................. 717/170 |

FOREIGN PATENT DOCUMENTS

| EP | 1469385 A2 | 10/2004 |
| JP | B2 2871433 | 3/1999 |
| JP | 11-272506 A | 10/1999 |
| JP | 2002-051363 | 2/2002 |
| JP | 2003-085317 | 3/2003 |
| JP | A 2003-216430 | 7/2003 |
| JP | A 2003-233512 | 8/2003 |
| JP | 2003-296132 | 10/2003 |
| JP | A 2005-99967 | 4/2005 |
| WO | WO 02/25438 A1 | 3/2002 |

OTHER PUBLICATIONS

Sihvonen, et al. "Improving Release and Patch Management Processes: An Empirical Case Study on Process Challenges" 2010, IEEE, p. 232-237.*
Chinese Office Action dated Mar. 2, 2010 for corresponding Chinese Patent Application No. 200680053776.3 with partial English translation.
Office Action issued in corresponding Japanese Patent Application No. 2008-504928, dated Sep. 22, 2011 (with English translation).

(Continued)

*Primary Examiner* — Qamrun Nahar
(74) *Attorney, Agent, or Firm* — Fujitsu Patent Center

(57) ABSTRACT

An applicable patch selection device comprises a first extraction unit for extracting, on the basis of information on an application target system, information on all the patches unapplied to the application target system from among information on released patches, an input unit to which a user's policy is input, a second extraction unit for extracting, in accordance with the user's policy input into the input unit, information on an unapplied patch to be actually applied to the application target system from among the information on all the unapplied patches extracted by the first extraction unit, and an unapplied patch obtainment unit for obtaining an unapplied patch corresponding to the information, extracted by the second extraction unit, on the unapplied patch to be actually applied to the application target system.

11 Claims, 24 Drawing Sheets

OTHER PUBLICATIONS

Korean Intellectual Property Office—Notice of Preliminary Rejection issued Dec. 17, 2009, for Korean Application No. 10-2008-7021648 entitled: Applicable Patch Selection Device and Applicable Patch Selection Method (with partial English language translation).

Japanese Office Action mailed Jan. 17, 2012 for corresponding Japanese Application No. 2008-504928, with English-language Translation.

* cited by examiner

POLICY SETTING 1 (PLEASE CHECK ONE OF THE CHECKBOXES BELOW)

☐ PATCH FOR FREQUENTLY USED FUNCTION IS TO BE APPLIED

☐ PATCH FOR FREQUENTLY USED FUNCTION IS NOT TO BE APPLIED (PATCH FOR FUNCTION WITH LOW USE FREQUENCY IS TO BE APPLIED)

☐ ALL PATCHES ARE TO BE APPLIED

F I G. 6

POLICY SETTING 2 (PLEASE CHECK ONE OF THE CHECKBOXES BELOW)
☐ LATEST PATCH IS TO BE APPLIED
☐ PATCH FOR WHICH PRESCRIBED NUMBER OF DAYS HAS ELAPSED SINCE RELEASE
   IS TO BE APPLIED

FIG. 7

POLICY SETTING 3 (ONE OR MORE CAN BE CHECKED ☐ "AND" CONDITION ☐ "OR" CONDITION)
☐ PATCH FOR PANIC/SYSTEM DOWN IS TO BE APPLIED
☐ PATCH FOR HANG-UP/PROCESS NOT TERMINATING IS TO BE APPLIED
☐ PATCH FOR INVALID COMMANDS IS TO BE APPLIED
☐ PATCH FOR ABNORMAL PERFORMANCE IS TO BE APPLIED
☐ PATCH FOR FAILURE TYPE OF SECURITY IS TO BE APPLIED
☐ PATCHES FOR ALL FAILURE TYPES ARE TO BE APPLIED

FIG. 8

| DATE OF CHECK | FILES ACCESSED |
|---|---|
| 10/10 | File1 File2 |
| 10/11 | File1 |
| 10/12 | File3 |
| 10/13 | File1 |
| 10/14 | File1 File2 |
| 10/15 | File1 |
| 10/16 | File1 |

FIG. 9

| FILE NAME | NUMBER OF TIMES OF ACCESSING |
|---|---|
| File1 | 6 |
| File2 | 2 |
| File3 | 1 |

FIG. 10

| PATCH NUMBER | RELEASE DATE | PKG TO BE FIXED | FAILURE TYPE |
| --- | --- | --- | --- |
| Patch1 | 2005/10/7 | PkgA | SYSTEM DOWN |
| Patch2 | 2003/10/10 | PkgB, PkgC | SECURITY AND INVALID COMMANDS |
| Patch3 | 2004/2/4 | PkgC | INVALID COMMANDS |
| Patch4 | 2005/10/20 | PkgD | SECURITY |
| Patch5 | 2003/02/02 | PkgC | INVALID COMMANDS |
| Patch6 | 2004/09/09 | PkgC | SECURITY |

FIG. 11

| FILE NAME | NAME OF PKG |
|---|---|
| File1 | PkgC |
| File2 | PkgC |
| File3 | PkgA |
| File4 | PkgB |

LIST FOR ALL THE UNAPPLIED PATCHES
ALL THE UNAPPLIED PATCHES THAT CAN BE APPLIED TO APPLICATION TARGET SYSTEM XXX ARE LISTED BELOW

| PATCH ID | PATCH PROFILE | RELEASE DATE | FAILURE TYPE |
|---|---|---|---|
| 100012-01 | OS: Format Patch | 2005/12/12 | SYSTEM DOWN |
| 200000-09 | OS: Network File System Patch | 2005/12/21 | SECURITY |
| 198011-02 | OS: Graphic Patch | 2005/11/30 | SECURITY |
| 180022-03 | OS: Kernel Patch | 2006/01/25 | SYSTEM DOWN |
| 177711-07 | OS: Connection Client Patch | 2006/01/06 | ABNORMAL PERFORMANCE |
| 111121-08 | OS: Device Driver Patch | 2005/11/29 | SECURITY |
| 192356-06 | APPLICATION 1.0: Display Manager Patch | 2006/1/20 | SECURITY |

NEXT    CANCEL

POLICY SETTING 0
DEFINITION OF FREQUENTLY USED FUNCTIONS
 WHEN A FUNCTION HAS BEEN USED [___] TIMES OR MORE
WITHIN [___] DAYS, THAT FUNCTION IS DEFINED AS A
FREQUENTLY USED FUNCTION

[ SKIP ]   [ OK ]   [ CANCEL ]

F I G.  1 5

LIST FOR ALL THE UNAPPLIED PATCHES
PATCHES FOR FREQUENTLY USED FUNCTIONS FROM AMONG ALL THE PATCHES UNAPPLIED TO APPLICATION TARGET SYSTEM XXX ARE LISTED BELOW
(PATCHES FOR FREQUENTLY USED FUNCTIONS ARE SHADED)

| PATCH ID | PATCH PROFILE | RELEASE DATE | FAILURE TYPE |
|---|---|---|---|
| 100012-01 | OS: Format Patch | 2005/12/12 | SYSTEM DOWN |
| 200000-09 | OS: Network File System Patch | 2005/12/21 | SECURITY |
| 198011-02 | OS: Graphic Patch | 2005/11/30 | SECURITY |
| 180022-03 | OS: Kernel Patch | 2006/01/25 | SYSTEM DOWN |
| 177711-07 | OS: Connection Client Patch | 2006/01/06 | ABNORMAL PERFORMANCE |
| 111121-08 | OS: Device Driver Patch | 2005/11/29 | SECURITY |
| 192356-06 | APPLICATION 10: Display Manager Patch | 2006/1/20 | SECURITY |

NEXT    BACK

FIG. 16

POLICY SETTING 1 (PLEASE CHECK ONE OF THE CHECKBOXES BELOW)
☐ PATCH FOR FREQUENTLY USED FUNCTION IS TO BE APPLIED
☐ PATCH FOR FREQUENTLY USED FUNCTION IS NOT TO BE APPLIED
   (PATCH FOR FUNCTION WITH LOW USE FREQUENCY IS TO BE
   APPLIED)
☐ ALL PATCHES ARE TO BE APPLIED

[ OK ]      [ CANCEL ]

FIG. 17

LIST FOR UNAPPLIED PATCHES EXTRACTED
PATCHES EXTRACTED FROM ALL THE PATCHES UNAPPLIED TO APPLICATION TARGET SYSTEM XXXX IN ACCORDANCE WITH POLICY ARE LISTED BELOW

| PATCH ID | PATCH PROFILE | RELEASE DATE | FAILURE TYPE |
|---|---|---|---|
| 100012-01 | OS: Format Patch | 2005/12/12 | SYSTEM DOWN |
| 200000-09 | OS: Network File System Patch | 2005/12/21 | SECURITY |
| 180022-03 | OS: Kernel Patch | 2006/01/25 | SYSTEM DOWN |
| 111121-08 | OS: Device Driver Patch | 2005/11/29 | SECURITY |
| 192356-06 | APPLICATION 1.0: Display Manager Patch | 2006/1/20 | SECURITY |

NEXT   OK   CANCEL

FIG. 18

POLICY SETTING 2 (PLEASE CHECK ONE OF THE CHECKBOXES BELOW)
☐ LATEST PATCH IS TO BE APPLIED
☐ PATCH FOR WHICH [    ] DAYS HAS ELAPSED SINCE RELEASE IS
   TO BE APPLIED

[ OK ]     [ CANCEL ]

FIG. 19

LIST FOR UNAPPLIED PATCHES EXTRACTED
PATCHES EXTRACTED FROM ALL THE PATCHES UNAPPLIED TO APPLICATION TARGET SYSTEM XXXX IN ACCORDANCE WITH POLICY ARE LISTED BELOW

| PATCH ID | PATCH PROFILE | RELEASE DATE | FAILURE TYPE |
|---|---|---|---|
| 100012-01 | OS: Format Patch | 2005/12/12 | SYSTEM DOWN |
| 200000-09 | OS: Network File System Patch | 2005/12/21 | SECURITY |
| 111121-08 | OS: Device Driver Patch | 2005/11/29 | SECURITY |

NEXT    OK    CANCEL

FIG. 20

POLICY SETTING 3 (ONE OR MORE CAN BE CHECKED ☐ "AND" CONDITION ☐ "OR" CONDITION)
☐ PATCH FOR PANIC/SYSTEM DOWN IS TO BE APPLIED
☐ PATCH FOR HANG-UP/PROCESS NOT TERMINATING IS TO BE APPLIED
☐ PATCH FOR INVALID COMMANDS IS TO BE APPLIED
☐ PATCH FOR ABNORMAL PERFORMANCE IS TO BE APPLIED
☐ PATCH FOR FAILURE TYPE OF SECURITY IS TO BE APPLIED
☐ PATCHES FOR ALL FAILURE TYPES ARE TO BE APPLIED

[ OK ]   [ CANCEL ]

LIST FOR UNAPPLIED PATCHES EXTRACTED
PATCHES EXTRACTED FROM ALL THE PATCHES UNAPPLIED TO APPLICATION TARGET SYSTEM XXXX IN ACCORDANCE
WITH POLICY ARE LISTED BELOW

| PATCH ID | PATCH PROFILE | RELEASE DATE | FAILURE TYPE |
|---|---|---|---|
| 200000-09 | OS: Network File System Patch | 2005/12/21 | SECURITY |
| 111121-08 | OS: Device Driver Patch | 2005/11/29 | SECURITY |

NEXT    OK    CANCEL

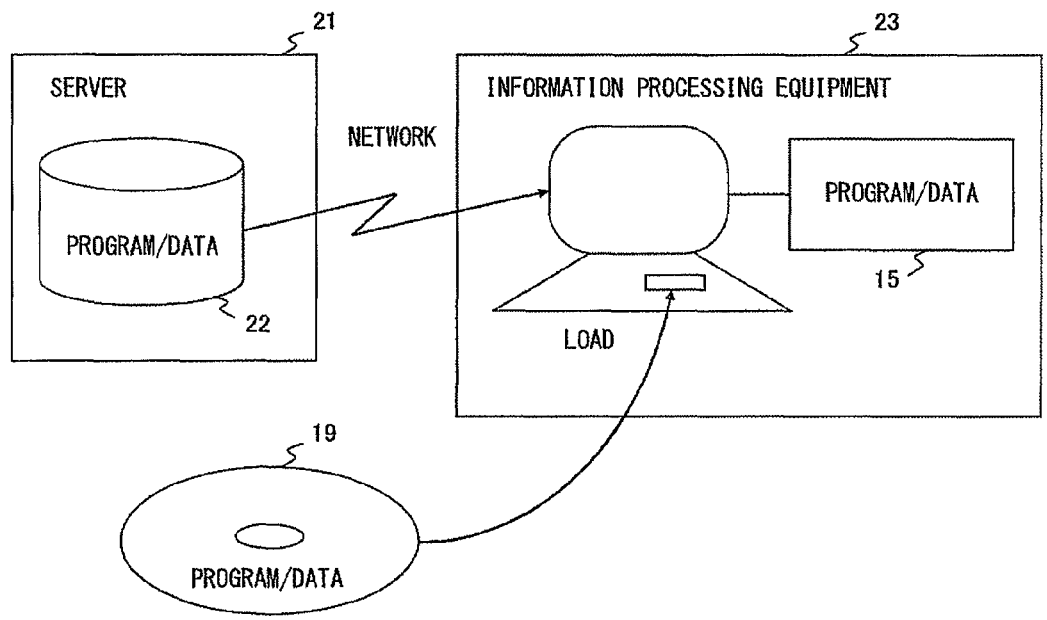
F I G. 2 4

APPLICABLE PATCH SELECTION DEVICE AND APPLICABLE PATCH SELECTION METHOD

CROSS REFERENCE TO RELATED APPLICATION

This application is a continuation of PCT application of PCT/JP2006/304742, which was filed on Mar. 10, 2006.

BACKGROUND OF THE INVENTION

1. Field of the Invention

The present invention relates to a device and a method of selecting a patch to be applied to a system.

2. Description of the Related Art

In recent years, there has been demand for the function of automatically selecting a patch to be applied to a system for fixing failures or performing small scale version upgrades or the like in software. The demand for this is based on the reasons described below.

First, a large number of patches for operating systems (OSs) or application programs installed on systems are provided by venders, etc., and it takes a long time and special knowledge to select the desired patch from among such a great number of patches. Also, it is demanded that as small a number of patches as possible be applied to a system without applying unnecessary patches in order to stably operate the system. Further, some users have their own policies, and accordingly not all users want to use the latest patches or the like to fix fatal failures immediately after the release of such patches.

In the current state of the art, the function of selecting a patch to be applied to a system in accordance with the policy of a particular user is not achieved. Accordingly, users apply a plurality of patches in a lump mainly by using a cluster (a group of patches) provided by venders or by using patch management tools. Without clusters or patch management tools, users have to obtain the failure information etc. manually by themselves in order to select and apply necessary patch.

Some clusters include only patches that have been categorized on the basis of hardware or OS information, or include only patches that are recommended by the venders to be applied to fix fatal failures (patches having flags like security patches or recommended patches). Users usually use a group of patches in a lump in units of clusters, use all the latest patches that have not yet been applied (hereinafter, a patch that has not yet been applied is referred to as an "unapplied patch") in a lump by extracting such patches using patch management tools or the like, or use patches having flags like security patches and recommended patches in a lump. Without them, users have to obtain released failure information or the operation status of the system, etc. by themselves in order to select and apply a necessary patch.

When a cluster or a patch management tool is used, the failures in a system are fixed at once because a plurality of patches are applied to the system in a lump. However, patches that are not desired to be applied are also applied. In order to avoid applying the undesired patches, users have to select and apply necessary patches one-by-one on the basis of the obtained failure information etc. by themselves, which is troublesome.

As an example of a technique related to applying patches to a system, Patent Document 1 discloses a method in which patches and an activation file including an execution program to which the patches have not been applied are transmitted from a front system to a back-end system when the system is activated, and in the back-end system, the patches are applied to the execution program included in the activation file; thereafter, when the system is terminated, the activation file including the execution file to which the patches have been applied is transmitted to the front-end system, and when the system is activated next time, the execution program to which the patches have been applied is transmitted from the front system to the back-end system.

In the current state of art as describe above, there are problems as described below regarding applying patches to systems.

First, there are a large number of patches for pieces of software installed on a system, and accordingly it takes an immense time if all of these patches are to be applied to the system. For example, some operating systems have several hundred patches released for them, and if all of them are to be applied, an immense time will be taken.

It is desirable to select only a necessary patch from among as many patches as possible, and to apply it only to necessary points. However, it takes a long time and special knowledge to select a patch from an immense volume of information.

Further, when a plurality of patches are used in a group such as a cluster, there is an advantage whereby fatal failures can be fixed in a manner recommended by the vendor. However, doing this takes a long time, and there are disadvantages whereby patches for functions with low use frequency can be applied, and whereby patches that have already been applied can be applied again. Also, there is a disadvantage whereby a cluster does not include patches for the products (functions) that are not targets of the cluster.

Also, some users desire to always have the latest patches applied to functions that are frequently used. By contrast, in order to prevent the operations of their systems from being affected, other users do not desire to apply the latest patches when the systems involve failures for some functions but are currently able to operate without any actual problems because the conditions for the failures that would result without the patches are currently unfulfilled. Also, still other users desire to apply only a patch for which a substantial time has elapsed since its release because patches that have been released for only a short time have not been proven to not have problems and can cause a performance decrease, thus being treated as bad patches (patches that cause a performance decrease and are therefore recalled after the release). However, in the current state of art, there is no function for selecting a patch to be applied to the system in accordance with users' policies.

In view of the above problems, it is an object of the present invention to provide an applicable patch selection device and a method of selecting an applicable patch by which only the patch the user desires to be applied is automatically selected in a simple manner from among a large number of patches that can be applied to a system.

Patent Document 1: Japanese Patent No. 2871433

SUMMARY OF THE INVENTION

An applicable patch selection device according to a first aspect of the present invention comprises a first extraction unit for extracting, on the basis of information on an application target system, information on all the patches unapplied to the application target system from among information on released patches, an input unit to which a user's policy is input, a second extraction unit for extracting, in accordance with the user's policy input into the input unit, information on an unapplied patch to be actually applied to the application target system from among the information on all the unapplied patches extracted by the first extraction unit, and an unapplied patch obtainment unit for obtaining an unapplied patch corresponding to the information, extracted by the second extraction unit, on the unapplied patch to be actually applied to the application target system.

An applicable patch selection method according to a second aspect of the present invention comprises extracting, on the basis of information on an application target system, information on all the patches unapplied to the application target system from among information on released patches, extracting, in accordance with input user's policy, information on an unapplied patch to be actually applied to the application target system from among the information on all the unapplied patches, and obtaining an unapplied patch corresponding to the information on the unapplied patch to be actually applied to the application target system.

According to the device and the method of the above aspects of the present invention, it is possible to easily select and obtain a patch to be applied to the application target system in accordance with the user's policy.

BRIEF DESCRIPTION OF THE DRAWINGS

The present invention will be more clearly understood by studying the detailed explanations below with reference to the attached drawings listed below.

FIG. 6 shows an example of a policy input window (policy setting 1 window);

FIG. 7 shows an example of a policy input window (policy setting 2 window);

FIG. 8 shows an example of a policy input window (policy setting 3 window);

FIG. 9 shows a check result covering the past seven days from the present;

FIG. 10 shows an example of information stored in DB2;

FIG. 11 shows an example of information on the latest patches stored in DB8;

FIG. 12 shows an example of information imported from DB3;

FIG. 14 shows an example of a list window for all the unapplied patches displayed in S1;

FIG. 15 shows an example of a policy input window (policy setting 0 window) displayed in S2;

FIG. 16 shows an example of a list window for all the unapplied patches displayed in S3;

FIG. 17 shows an example of a policy input window (policy setting 1 window) displayed in S4;

FIG. 18 shows an example of a list window displayed in S4;

FIG. 19 shows an example of a policy input window (policy setting 2 window) displayed in S5;

FIG. 20 shows an example of a list window displayed in S5;

FIG. 21 shows an example of a policy input window (policy setting 3 window) displayed in S6;

FIG. 22 shows an example of a list window displayed in S6;

FIG. 24 shows a storage medium.

DESCRIPTION OF THE PREFERRED EMBODIMENTS

Figure 1:
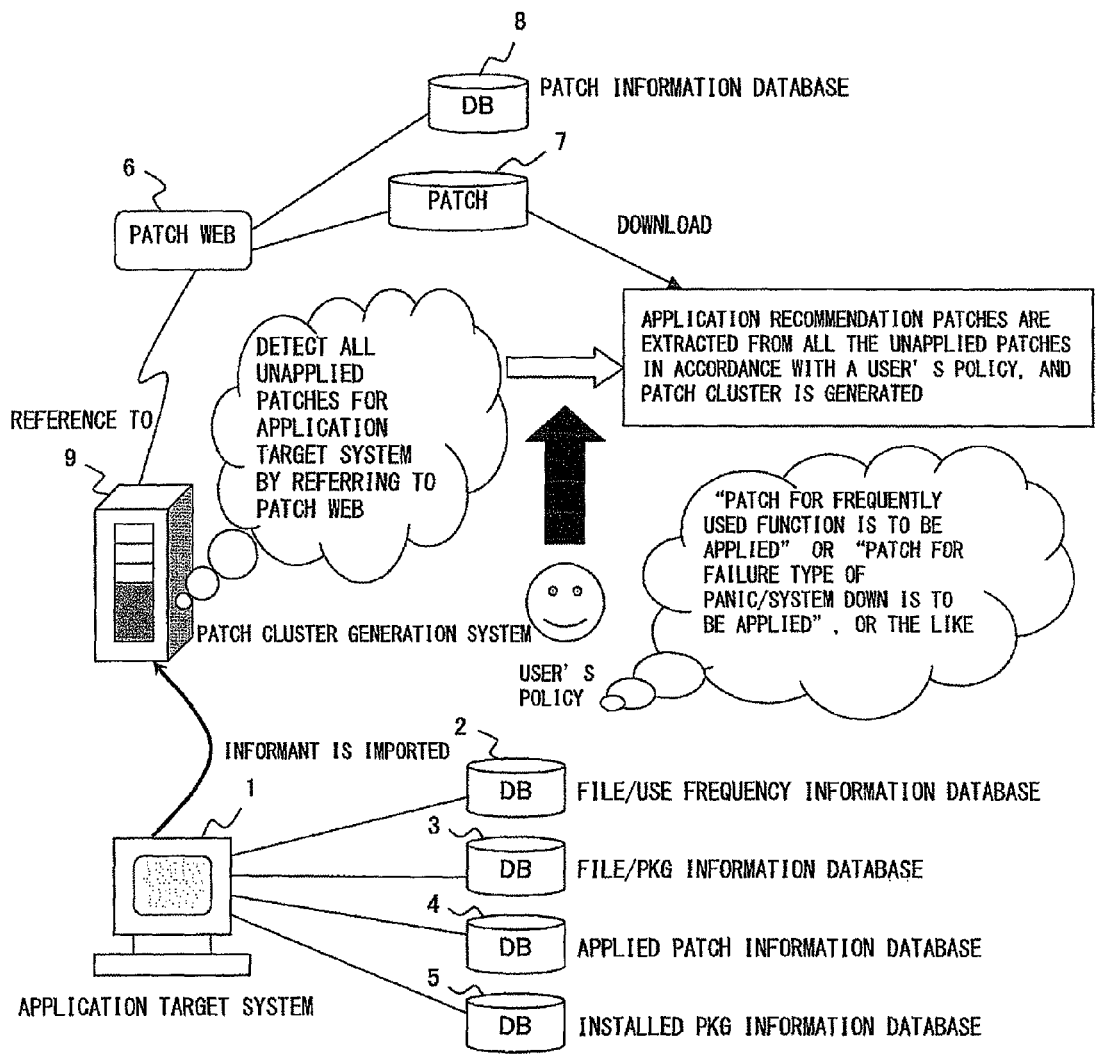
FIG. 1 schematically shows an entire system including a patch cluster generation system to which the present invention is applied.

Hereinafter, embodiments of the present invention will be explained by referring to the drawings.

FIG. 1 schematically shows an entire system including a patch cluster generation system to which the present invention is applied.

In FIG. 1, an application target system 1 is a system to which patches are to be applied. The application target system 1 has four databases; specifically, a file/use frequency information database 2 (simply referred to as "DB2" hereinafter), a file/PKG (package) information database 3 (simply referred to as "DB3" hereinafter), an applied patch information database 4 (simply referred to as "DB4" hereinafter), and an installed PKG information database 5 (simply referred to as "DB5" hereinafter).

Note that in the present example, "file" refers to a file for realizing a function, specifically a program file, library, or a data file. Also, PKG refers to a group of files constituting a product (such as a group of functions constituting an OS).

The DB2 is a database for storing information of the files that were used in the application target system 1 and the use frequency. The DB3 is a database for storing information of the files in the application target system 1 and the PKGs to which such files belong. The DB4 is a database for storing information of the patches applied to the application target system 1. DB5 is a database for storing information of the PKGs installed on the application target system 1. Note that the updating or the like of the information stored in the DBs 2 through 5 is performed by the application target system 1.

A Patch Web 6 exists in a communication network such as the Internet, and includes a patch storage device 7 storing the latest patches released and a patch information database 8 (referred to as "DB8" hereinafter) storing the information of such latest patches. The Patch Web 6 is a server providing the latest patches and information thereof as needed. The DB8 stores information of patches, such as a patch number (patch ID), a name of the PKG to be fixed, a release data, a failure type, etc. for each of the patches.

A patch cluster generation system 9 performs a process of generating, on the basis of the information on the application target system 1 and of the user's policy, a cluster including patches to be applied to the application target system 1 (patch cluster generation process). In this patch cluster generation process, when information on the application target system 1 is imported, the patch Web 6 connected via a communication network is referred to, and information on all the patches unapplied to the application target system 1 is extracted from the DB8 on the basis of that imported information. Subsequently, the information of the patch to be actually applied to the application target system 1 (application recommendation patches) is extracted from the information on all the unapplied patches in accordance with the particular policy (a policy whereby only a patch for a frequently used function is to be applied, a policy whereby only a patch for the failure type of "panic/system down" is to be applied, or the like) input by the user. Then, the application recommendation patches are downloaded from the patch storage device 7 in accordance with the information of the application recommendation patches, and a cluster of the application recommendation patches is generated.

The above is an outline of the entire system.

Next, a detailed explanation will be given for a patch cluster generation process performed by the patch cluster generation system 9.

First, policies that a user can input in this process will be explained.

In the present process, the user can input policies concerning:
(1) Whether or not patches for frequently used functions are to be applied?
(2) Whether or not the latest patch is to be applied? and
(3) What types of failures are to be treated as the target for application?

Figure 2:
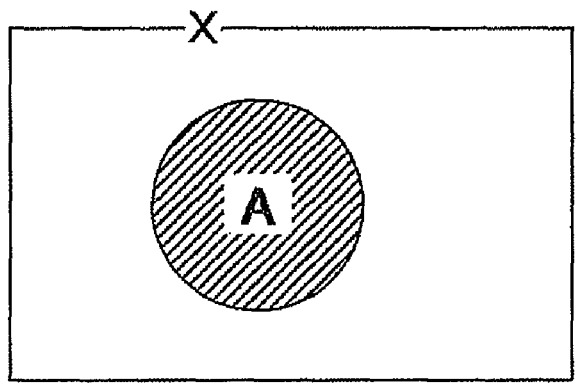
FIG. 2 shows a set of patches for frequently used functions.
Figure 3:
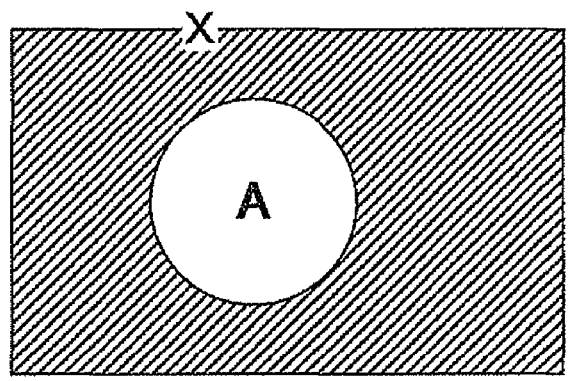
FIG. 3 shows a set of patches for functions with a low use frequency.

In inputting policy (1) above, the user can input one of "a patch for a frequently used function is to be applied", "a patch for a function with low use frequency is to be applied", and "all the patches are to be applied". When all the patches that can be applied but have not yet been applied to the application target system 1 are in set X, and the patches for the frequently used functions are in set A, the patches for the frequently used functions are represented as shown in FIG. 2, and the patches for the functions with low use frequency are represented as shown in FIG. 3. In other words, it is possible to extract patches in one of the sets set A, a group other than set A, and set X in response to the input of a user's policy (1) above.

Figure 4:
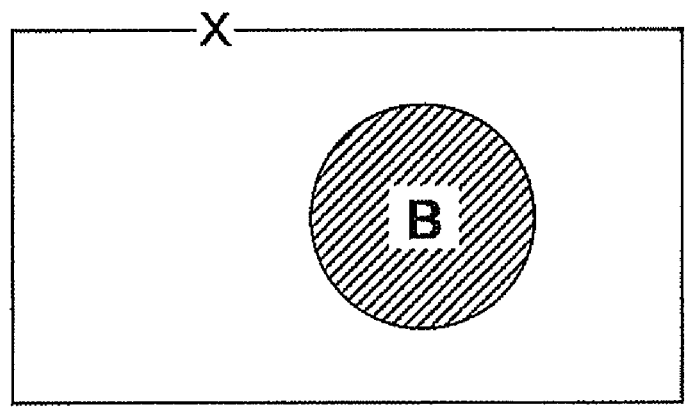
FIG. 4 shows a set of patches for which a prescribed period has elapsed since their release.

In inputting policy (2) above, the user can input one of "the latest patch is to be applied" and "a patch for which a prescribed time has elapsed since its release is to be applied". If patches for which a prescribed time has elapsed since their release are in set B, these patches are represented as shown in FIG. 4. Additionally, in FIG. 4, set X is the set of latest patches (which can also be considered to be all the patches that can be applied but have not yet been applied to the application target system 1). In other words, the user can extract the patches from set B or from set X by inputting policy (2) above.

Figure 5:
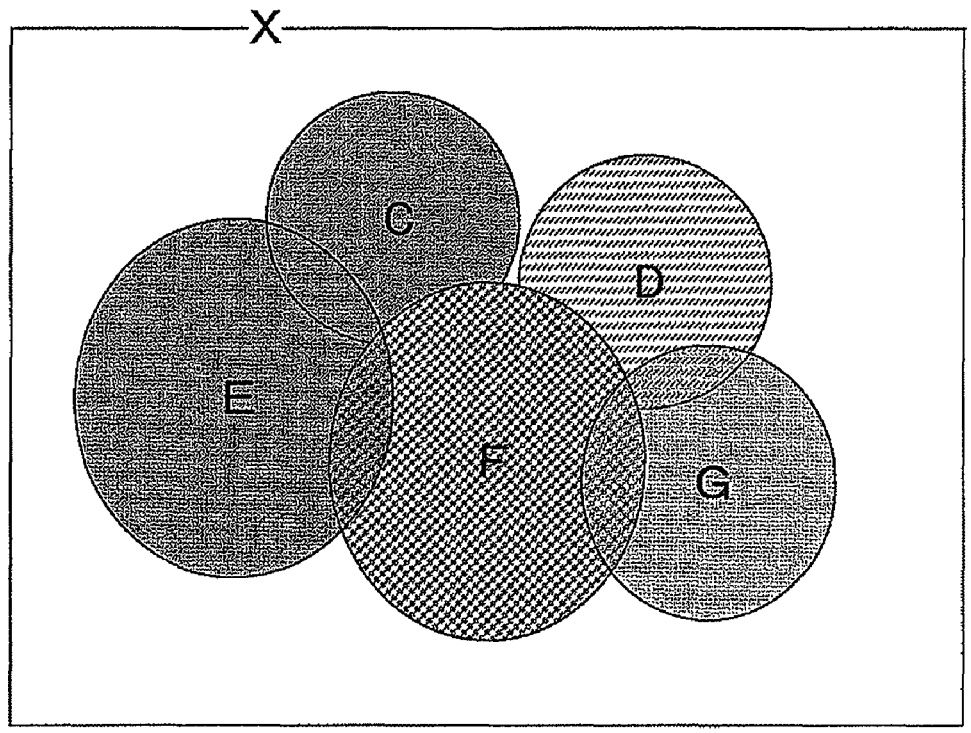
FIG. 5 shows sets of patches for respective failure types.

In inputting policy (3) above, the user can input one or more policies of "a patch for a failure type of panic/system down is to be applied", "a patch for a failure type of hang-up/process not terminating is to be applied", "a patch for a failure type of invalid commands is to be applied", "a patch for a failure type of an abnormal performance is to be applied", "a patch for a failure type of security is to be applied", and "patches for all failure types are to be applied" in a combination based on the AND operation or on the OR operation. When it is assumed that the patches for a failure type of panic/system down are in set C, the patches for a failure type of hang-up/process not terminating are in set D, the patches for a failure type of invalid commands are in set E, the patches for a failure type of an abnormal performance are in set F, and the patches for failure type of security are in set G, the patches for the respective failure types are represented as shown in FIG. 5. Additionally, in FIG. 5, set X is a set of all the patches that can be applied but have not yet been applied to the application target system 1. As shown in FIG. 5, sets C through G have overlapping portions and non-overlapping portions. In other words, the user can extract the patches in one of sets C, D, E, F, and G, patches in a combination thereof (based on an AND operation or on an OR operation), or the patches in set X.

Further, it is possible to narrow the scope of the patches to be extracted by applying the AND operation to the above policies (1) through (3). This narrowing is realized by applying the AND operation to (1), (2), and (3) above, i.e., (1) a patch for a frequently used function is to be applied, (2) a patch for which a prescribed time has elapsed since its release is to be applied, and (3) a patch for a failure type of "security" is to be applied. Alternatively, the AND operation may be applied to (1) and (2) above, i.e., (1) a patch for a function with low use frequency is to be applied and (2) the latest patch is to be applied. In this case, policy (3) above is not taken into consideration. It is also possible to apply the AND operation to (2) and (3) above, i.e., (2) a patch for which a prescribed time has elapsed since its release is to be applied and (3) a patch for a failure type of "panic/system down" is to be applied. In this case, policy (1) above is not taken into consideration.

The input of policies (1) through (3) can be performed in a policy input window displayed on a display device (not shown) included in the patch cluster generation system 9, or by inputting commands.

FIGS. 6 through 8 show an example of the policy input window. FIG. 6 shows a policy input window (policy setting 1 window) for (1) above. FIG. 7 shows a policy input window (policy setting 2 window) for (2) above. FIG. 8 shows a policy setting window (policy setting 3 window) for (3) above. In each of the policy setting windows, policies can be input and set by checking desired checkboxes by using an input device (not shown) provided in the patch cluster generation system 9.

Next, information that is imported and is used in the application target system 1 for the patch cluster generation process will be explained.

In this process, information stored in DB2 regarding the files used by the application target system 1 during a period from the present to a prescribed past point and the use frequency of the files, information stored in DB3 regarding the files in the application target system 1 and the PKGs, information stored in DB4 regarding the patches applied to the application target system 1, and information stored in DB5 regarding the PKGs installed on the application target system 1 are imported as information that is imported and is used in the application target system 1.

Additionally, the information stored in DB2 is updated on the basis of the status of the application target system 1 checked periodically (for example, once a day). Specifically, the history of the accesses to all the files in the application target system 1 (usage history) and the files being used when the check is performed are checked once every certain period, and the information is updated on the basis of the result of this check.

For example, the status of the system is checked once a day and if the check result concerning the past seven days from the present is as shown in FIG. 9, the information stored in the DB2 is as shown in FIG. 10. In this case, file1 has been accessed six times, file2 has been accesses twice, and file3 has been accessed once during the seven days from the present (from 10/10 through 10/16) as the check result in FIG. 9 shows. Accordingly, the information stored in DB2 at the present time is information representing that the number of accesses to file1 is six, the number of accesses to file2 is two, and the number of accesses to file 3 is one, as shown in FIG. 10.

The information stored in DB3 and DB5 is updated each time a PKG is installed on the application target system 1. The information stored in DB4 is updated each time a patch is applied to the application target system 1. Also, the functions of DB3 through DB5 can be realized by using functions included in the OS installed on the application target system 1. Also, the information stored in DB4 and DB5 can also be obtained by using the patch related commands of the OS installed on the application target system 1.

Next, extraction of all the patches unapplied to the application target system 1 performed in the patch cluster generation process on the basis of the imported information on the application target system 1 will be explained.

In this process, when information on the application target system 1 is imported, the patch Web 6 is referred to, and information on all the patches that can be applied to the application target system 1 is extracted on the basis of the information on the latest patches stored in the DB8 and on the imported information of DB5 (information on the PKGs installed on the application target system 1). Then, information on the patches that have already been applied is removed on the basis of the imported information of DB4 (information on the patches already applied to the application target system 1), and information on all the patches unapplied to the application target system 1 is extracted.

It is assumed for example that the information shown in FIG. 11 is stored in DB8 as the information on the latest patches and that the PKGs installed on the application target system 1 are recognized to be PkgC and PkgD on the basis of the imported information of DB5. In this case, the information on the patches extracted from DB8 as the information on all the patches that can be applied to the application target system 1 is information of the patches that include information of PkgC or PkgD and whose patch numbers are Patch2, Patch3, Patch4, Patch5, and Patch6. Further, it is also assumed that the patch whose patch number is Patch3 is recognized to have already been applied to the application target system 1 on the basis of the imported information of DB4. In this case, the information, on all the patches unapplied to the application target system 1, that will be extracted is information on the patches whose patch numbers are Patch2, Patch4, Patch5, and Patch6, excluding the patch whose patch number is patch3.

DB8 includes information on model information, version information of the OS, the dependence relationship between patches, and the like in addition to information on patch number, release data, a PKG to be fixed, and the failure type for each patch shown in FIG. 11. It is also possible to take this information into consideration when extracting the information on all the unapplied patches.

Next, the extraction of the information on the application recommendation patches from the extracted information on all the patches unapplied to the application target system 1 will be explained. This extraction is performed in accordance with the user's policy in the patch cluster generation process.

In the present process, when the input user's policy is, for example, that "a patch for a frequently used function is to be applied", information on frequently used files is extracted on the basis of the imported information of DB2 and on the definition of the frequently used files. This definition will be explained later. Then, the information on the frequently used files and the imported information of the DB3 are used to extract the names of the PKGs to which the frequently used files belong.

For example, if files that have been accessed six times or more are defined as the frequently used files, the imported information of DB2 is as shown in FIG. 10, and the imported information of DB3 is as shown in FIG. 12, File1 is first extracted as a frequently used file in accordance with the imported information of DB2, and PkgC is extracted as the name of the PKG to which File1 belongs in accordance with the information of DB3 shown in FIG. 12.

Then, information on the patches for the frequently used functions is extracted on the basis of the extracted information on all the unapplied patches and on the basis of the name of the PKG to which the frequently used files belong.

For example, when the extracted information on all the unapplied patches is the information on the patches whose patch numbers are Patch2, Patch4, Patch5, and Patch6 in the information of DB8 shown in FIG. 11 and the name of the PKG to which the frequently used files belong is PkgC, the extracted information on the patches for the frequently used functions is information of the patches that include information of PkgC and whose patch numbers are Patch2, Patch5, and Patch6.

When the input user's policy is, for example, that "a patch for which three months has elapsed since its release is to be applied" in the patch cluster generation process, information on the patches for which three months has elapsed from the release dates is extracted from the information on all the unapplied patches.

For example, when the extracted information on the unapplied patches is information of the patches whose patch numbers are Patch2, Patch4, Patch5, and Patch6 in the information in DB8 shown in FIG. 11 and the present time is Oct. 20, 2005, the information extracted as the information on the patches for which three months has elapsed from the release is information on the patches whose patch numbers are Patch2, Patch5, and Patch6.

Also, when the input user's policy is, for example, that "a patch for a failure type of invalid commands is to be applied" in the patch cluster generation process, information on the patches for failure types of "invalid commands" is extracted from the extracted information on all the unapplied patches.

When, for example, the extracted information on all the unapplied patches is information on the patches whose patch numbers are Patch2, Patch4, Patch5, and Patch6 in the information in DB8 shown in FIG. 11, the information on the patches for failure types of "invalid commands" is information on the patches whose patch numbers are Patch2 and Patch5.

Next, the patch cluster generation process including the above respective steps will be explained by referring to FIGS. 13 through 22.

Figure 13:
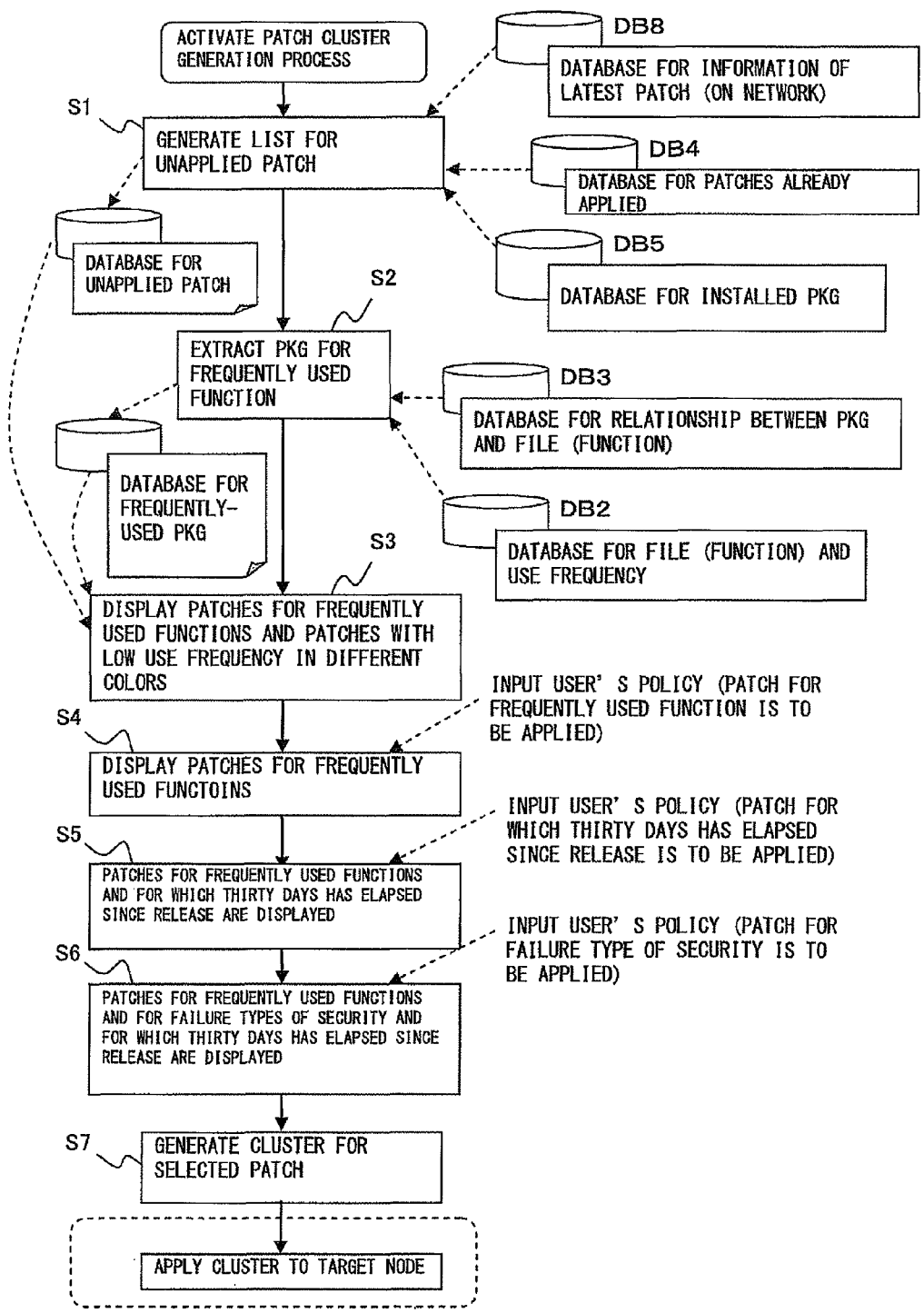
FIG. 13 shows a flowchart for an example of a patch cluster generation process.

FIG. 13 shows a flowchart for an example of the patch cluster generation process. FIGS. 14 through 22 show examples of windows displayed during the execution on a display device (not shown) in the patch cluster generation system 9.

In the flowchart shown in FIG. 13, explanations are given by using an exemplary case in which user's policies of (1) "a patch for a frequently used function is to be applied", (2) "a patch for which three months has elapsed since its release is to be applied", and (3) "a patch for a failure type of security is to be applied" are input. Also, in the flowchart shown in FIG. 13, the solid-line arrows represent the flow of the process, and the dashed-line arrows represent the flow of data.

In FIG. 13, when the information on the application target system 1 (information stored in DB2 through DB5) is imported into the patch cluster generation system 9 and the patch cluster generation process is activated, information on all the patches that can be applied to the application target system 1 is extracted on the basis of the imported information of DB5 (information on the PKGs installed on the application target system 1) and the information of the DB8 of the patch Web6 (information on the latest patches). Then, information on all the unapplied patches is extracted by removing information on the patches that have already been applied on the basis of the imported information of DB4 (information on the patches already applied to the application target system 1). The extracted information is stored in a database (not shown) in the patch cluster generation system 9 for unapplied patches (S1). Also, in this S1, the extracted information on all the unapplied patches is displayed in a listed manner.

FIG. 14 shows an example of a list window for all the unapplied patches displayed in S1. Additionally, "xxx" in the list window represents the node name of the application target system 1 (this applies also to the other list windows). As shown in FIG. 14, a patch ID (patch number), a patch profile (PKGs to be fixed or the like), a release date, and a failure type are shown for each of the unapplied patches. Also, this list window has a "Next" button and a "Cancel" button so that the user can make the process proceed to S2 by pressing the "Next" button. Also, the user can terminate the patch cluster generation process itself by pressing the "Cancel" button (this applies to other list windows and policy input windows).

When the "Next" button is pressed in this list window, a policy input window (policy setting 0 window) for accepting the user's input of a definition of frequently used functions is displayed, information on files of the frequently used functions is extracted on the basis of the definition of the frequently used functions in accordance with the user's input in the policy input window and on the basis of the imported information of DB2 (information on file and use frequency), information on the PKGs for frequently used functions on the basis of this information and the imported information of DB3 (information on file and PKGs) is extracted, and this information is stored in a database (not shown) for frequently used PKGs provided to the patch cluster generation system 9 (S2).

FIG. 15 shows an example of the policy input window (policy setting 0 window) displayed in S2. As shown in FIG. 15, the user can define frequently used functions by inputting a desired period (number of days) and the number of times into this policy input window and pressing the "OK" button. Also, this policy input button has a "Skip" button and a "Cancel" button so that the user can make the process skip to S5 by pressing the "Skip" button.

When the desired number of days and number of times are input by the user and the "OK" button is pressed in this policy input window so as to terminate the process in S2, all the unapplied patches are displayed in a listed manner (S3) on the basis of the information on all the unapplied patches, which is stored in the database for unapplied patches in S1, and the information on the PKGs for frequently used functions stored in a database for frequently used PKGs in S2 in such a manner that the patches for frequently used functions and the patches with low use frequency can be discriminated from each other.

FIG. 16 shows an example of a list window for all the unapplied patches displayed in S3. In the example of FIG. 16, only information on the patches for frequently used functions are to be shaded so that they can be distinguished from information on patches for functions with low use frequency. Also, this list window has a "Next" button and a "Back" button so that the user can make the process proceed to S4 and can also make the process return to S2 respectively by pressing the "Next" button and the "Back" button. Accordingly, the user can make the policy input window shown in FIG. 15 appear again by pressing the "Back" button so that he/she can again define the frequently used functions.

When the "Next" button is pressed by the user in the list window shown in FIG. 16, the policy input window (policy setting 1 window) that accepts the user's input of the policy (1) is displayed, information on the patches for particular unapplied patches is extracted from the information on all the unapplied patches, which are stored in the database for the unapplied patches in S1, in accordance with the input into this policy input window, and this information is displayed in a listed manner (S4).

FIG. 17 shows an example of the policy input window (policy setting 1 window) displayed in S4. As shown in FIG. 17, when the user checks one of the checkboxes and presses the "OK" button in this policy input window, policy (1) above can be input. Also, this policy input window has a "Cancel" button as well.

Because a patch for a frequently used function is to be applied in this example, the checkbox for "a patch for a frequently used function" is checked and the "OK" button is pressed in this policy input window. Then, information on the patches for frequently used functions is extracted from the information on all the unapplied patches stored in the database for unapplied patches in S1, and this information is displayed in a listed manner.

FIG. 18 shows an example of a list window displayed in S4. As shown in FIG. 18, only the information on the patches for frequently used functions in the list window shown in FIG. 16 is shown in a listed manner. Also, this list window has a "Next" button, an "OK" button, and a "Cancel" button so that the user can make the process proceed to S5 and can make the process proceed to S7 respectively by pressing the "Next" button and the "OK" button.

Because policies (2) and (3) above are also input in this example, the "Next" button is pressed in the list window shown in FIG. 18.

Next, a policy input window (policy setting 2 window) for accepting the user's input of policy (2) is displayed, and information on particular unapplied patches is extracted from the information on the unapplied patches extracted in S4 in accordance with the input into the policy input window, and this information is displayed in a listed manner (S5).

FIG. 19 shows an example of the policy input window (policy setting 2 window) displayed in S5. As shown in FIG. 19, the user checks one of the checkboxes in the policy input window and presses the "OK" button, and thereby can input policy (2). Also, when a patch for which a prescribed period has elapsed since its release is to be applied, the user can input that period in units of days in this policy input window. Also, this policy input window has a "Cancel" button.

In the present example, a patch for which thirty days has elapsed since its release is to be applied, and "30" is input as a prescribed period that can be input in units of days in this policy input window. Thereafter, the checkbox for "patch for which "30" days has elapsed since release is to be applied" is checked, and the "OK" button is pressed. Then, the information on the patches for which thirty days has elapsed since their release is extracted from the information on the unapplied patches extracted in S4, and this information is displayed in a listed manner.

FIG. 20 shows an example of the list window displayed in S5. As shown in FIG. 20, only the information on the patches for which thirty days has elapsed since their release, from among the information displayed in the list window shown in FIG. 18, is displayed in a listed manner. Note that the present date is Jan. 26, 2006 in the present example. Also, this list window has a "Next" button, an "OK" button, and a "Cancel" button. The user can make the process proceed to S6 and to S7 respectively by pressing the "Next" button and the "OK" button.

Because policy (3) is also input in the present example, the "Next" button is pressed in the list window shown in FIG. 20.

Next, a policy input window (policy setting 3 window) for accepting the user's input of policy (3) is displayed, and the information on the particular unapplied patches is extracted from the information on the unapplied patches extracted in S5 in accordance with the input to this policy input window, and the extracted information is displayed in a listed manner (S6).

FIG. 21 shows an example of the policy input window (policy setting 3 window) displayed in S6. As shown in FIG. 21, the user presses the "OK" button after checking one of the checkboxes or after checking one of the checkboxes for "AND condition" and "OR condition" and also checking two or more checkboxes (except for the checkbox for "patches for all failure types are to be applied"), and thereby policy (3) can be input. This policy input window also has a "Cancel" button.

Because a patch for a failure type of "Security" is to be applied in this example, the checkbox for "patch for failure type of security is to be applied" is checked in this policy input window, and the "OK" button is pressed. Then, the information on the patches for failure types of security is extracted from the information on the unapplied patches extracted in S5. This information is displayed in a listed manner.

FIG. 22 shows an example of the list window displayed in S6. As shown in FIG. 22, only the information on the patches for failure types of security in the list window of FIG. 20 is displayed in a listed manner. Also, this policy input window has an "OK" button and a "Cancel" button so that the user can make the process proceed to S7 by pressing the "OK" button.

When the "OK" button is pressed in this policy input window, the unapplied patches are downloaded from the patch storage device 7 of the patch Web 6 in accordance with the information on the unapplied patches extracted in S6, and a cluster for the unapplied patches is generated (S7). Thereafter, the generated cluster is applied to the application target system 1 as the target node.

As described above, according to the present process flow, it is possible to generate a cluster with only the desired patches selected from all the patches that can be applied to the application target system 1 in accordance with the user's policies that "patch for frequently used function is to be applied", "patch for which "30" days has elapsed since release is to be applied", and "patch for failure type of security is to be applied".

Additionally, an example has been explained in the process flow in which the above user's three policies (1) through (3) are input. However, it is also possible to similarly perform the process in a case when only one or two of the above three policies are input.

In the present process flow, it is also possible to maintain the states at the time of the input of information in the respective policy input windows, and to display the maintained states when the policy input window is used next time.

As described above, according to the present example, users can easily determine which patch to select under what policy, and the selection of a patch is not troubling because the users are given hints (information) such as patches for frequently used functions, release dates of patches, failure types, etc.

Further, information such as the use frequency of functions, the release dates of patches, failure types, etc. is automatically obtained, and accordingly users can save the trouble of searching and can avoid mistakes.

Further, the situation is avoided whereby patches that are not desired by users are selected for the application because patches are selected in accordance with the users' policies. In other words, the operations used for applying unnecessary patches are saved so that time taken for applying patches is also reduced.

Additionally, the information on the application target system 1 is imported to the patch cluster generation system 9 in the explanation of the present example. However, other configurations can be employed. For example, it is possible to employ a configuration in which the patch cluster generation system 9 and the application target system 1 are connected to each other via a communications network and the patch cluster generation system 9 accesses the respective DBs of the application target system 1 as necessary during the execution of processes so as to obtain the information.

Also, in explanation of an example of the present invention, the definitions of the frequently used functions can be arbitrarily set by the user in S2; however, the definitions may be set as fixed information in advance.

Also, in the explanation of an example of the present invention, the patch cluster generation system 9 defines the frequently used functions in accordance with the users' input, and extracts the information on the files of the frequently used functions in S2. However, other configurations may be employed. For example, the application target system 1 may perform this definition. In this case, the information on the files of the frequently used functions extracted by the application target system 1 is imported as the information of DB2 imported to the patch cluster generation system 9.

Figure 23:
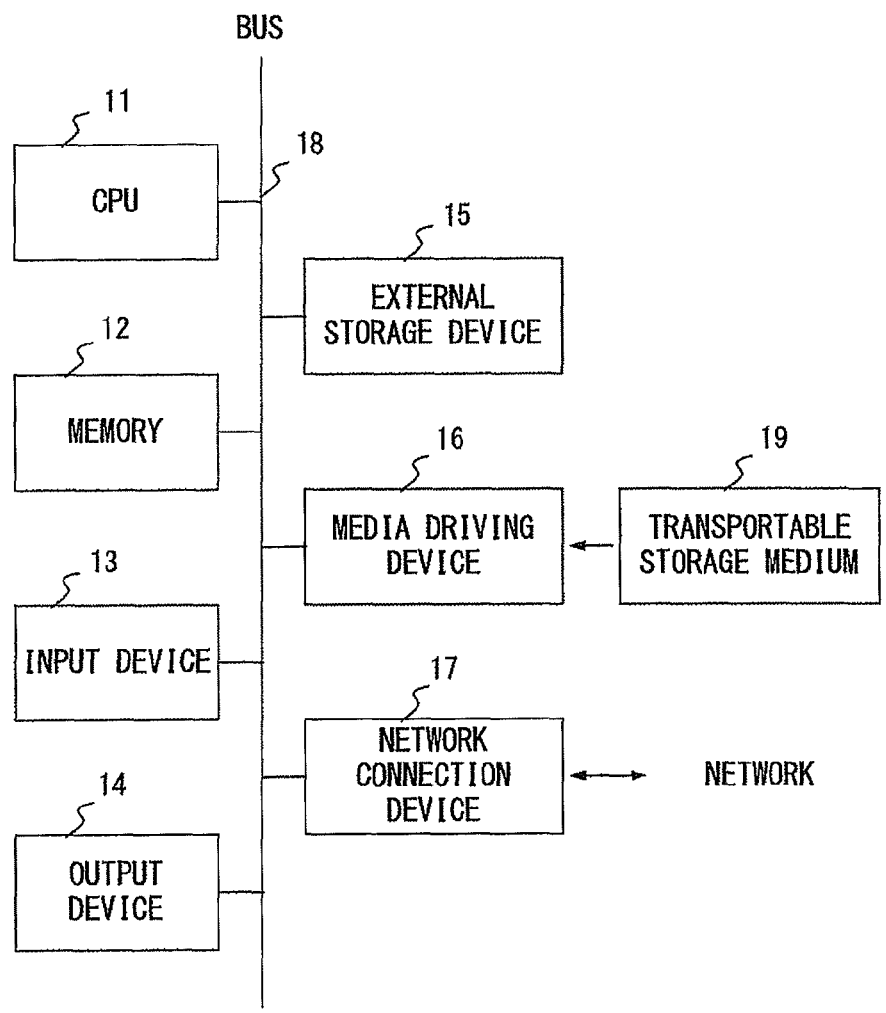
FIG. 23 shows a configuration of information processing equipment.

Each of the application target system 1, the patch Web 6, and the patch cluster generation system 9 shown in FIG. 1 is realized by information processing equipment (computer), for example, as shown in FIG. 23. The information processing equipment shown in FIG. 23 includes a CPU (central processing unit) 11, memory 12, an input device 13, an output device 14, an external storage device 15, a media driving device 16, and a network connection device 17 that are connected to one another via a bus 18.

The memory 12 includes, for example, ROM (read only memory), RAM (random access memory), and the like, and stores programs and data used for the processes. The CPU 11 performs necessary processes by using the memory 12 for executing the programs. For example, the CPU 12 performs the above described patch cluster generation process or the like when the information processing equipment serves as the patch cluster generation system 9.

Examples of the input device 13 are a keyboard, a pointing device, a touch panel, and the like. The input device 13 is used for inputting information or users' instructions. For example, when the information processing equipment serves as the patch cluster generation system 9, the input device 13 is used for accepting the users' policies, the operations of the respective buttons on the display windows, and the like. Examples of the output device 14 are a display device, a printer, and the like. The output device 14 is used for making inquiries to the users and outputting process results and the like. For example, when the information processing equipment serves as the patch cluster generation system 9, the output device 14 is used for displaying the above policy input windows and the respective list windows and the like.

Examples of the external storage device 15 are a magnetic disk device, an optical disk device, a magneto-optical disk device, a tape device, and the like. The information processing equipment stores the above programs and data in this external storage device 15, loads them onto the memory 12, and uses them as necessary. When the information processing equipment serves as the application target system 1, the external storage device 15 is used as DB2 through DB5. When the information processing equipment serves as the patch Web 6, the external storage device 15 is used as the DB8 and the patch storage device 7. When the information processing equipment serves as the patch cluster generation system 9, the external storage device 15 is used as the database for unapplied patches and as the PKG database for frequently used PKGs.

The media driving device 16 drives a transportable storage medium 19, and accesses the storage contents thereof. The transportable storage medium 19 is an arbitrary computer readable storage medium such as a memory card, a flexible disk, a CD-ROM (compact disk read only memory), an optical disk, a magneto-optical disk, or the like. The users store the above programs and data in the transportable storage medium 19, and use them by loading them into the memory 12 as necessary.

The network connection device 17 is connected to an arbitrary communications network such as a LAN (Local Area Network), the Internet, or the like, and performs the data conversions necessary for the communications. The information processing equipment receives the above program and data from external devices via the network connection device 17 as necessary, and uses them by loading them into the memory 12.

FIG. 24 shows a computer readable storage medium that can provide programs and data to the information processing equipment shown in FIG. 23. The programs and data stored in a database 22 in a server 21 or in the transportable storage medium 19 are loaded onto the memory 12 in information processing equipment 23. The server 21 generates carrier signals that carry the programs and data, and transmits the carrier signals to the information processing equipment 23 via an arbitrary transmission medium on the network. The CPU 11 executes the program and performs necessary processes by using the data.

The present invention has been described in detail; however, the scope of the present invention is not limited to any of the above embodiments, and various modifications and alterations are allowed without departing from the spirit of the present invention.

As described above, according to the present invention, it is possible to simply and automatically select a patch that users actually desire to be applied from among a large number of patches that can be applied to a target system.

What is claimed is:

1. An applicable patch selection device, comprising:
an input device to input a user's policy; and
a processing unit to extract first information on unapplied patches targeted to a package installed on an application target system from among information on released patches by comparing information on the installed package with information on packages fixed by the released patches,
    extract second information on unapplied patches in the application target system from among the extracted first information by comparing information on patches applied on the application target system with the extracted first information,
    extract third information on an unapplied patch which corresponds to a policy data input by the input device and is targeted to packages installed on the application target system from among the extracted second information by comparing information on a use frequency for the packages installed on the application target system with the policy data included information on a use frequency of package, and
    obtain an unapplied patch corresponding to the extracted third information.

2. The applicable patch selection device according to claim 1, wherein,
the processing unit generates a cluster for the obtained unapplied patch.

3. The applicable patch selection device according to claim 1, wherein:
the user's policy input into the input device includes a policy wherein a latest patch is to be applied or a policy wherein a patch for which a prescribed time has elapsed since release of the patch is to be applied.

4. The applicable patch selection device according to claim 1, wherein:
the user's policy input into the input device includes a policy wherein a patch for one failure type is to be applied or a policy wherein patches for two or more failure types based on an AND operation or an OR operation are to be applied.

5. The applicable patch selection device according to claim 1, wherein:
the information on released patches includes information on at least one of a patch number, release data, a package name, and a failure type for each of the patches.

6. An applicable patch selection method, comprising:
extracting first information on unapplied patches targeted to a package installed on an application target system from among information on released patches by comparing information on the installed package with information on packages fixed by the released patches;
extracting second information on unapplied patches in the application target system from among the extracted first information by comparing information on patches applied on the application target system with the extracted first information;
extracting third information on an unapplied patch which corresponds to an input user's policy and is targeted to packages installed on the application target system from among the extracted second information by comparing information on a use frequency for the packages installed on the application target system with policy data included information on a use frequency of package; and
obtaining an unapplied patch corresponding to the extracted third information.

7. The applicable patch selection method according to claim 6, further comprising:
generating a cluster for the unapplied patch obtained.

8. The applicable patch selection method according to claim 6, wherein:
the user's policy includes a policy wherein a latest patch is to be applied or a policy wherein a patch for which a prescribed time has elapsed since release of the patch is to be applied.

9. The applicable patch selection method according to claim 6, wherein:
the user's policy includes a policy wherein a patch for one failure type is to be applied or a policy wherein patches for two or more failure types based on an AND operation or an OR operation are to be applied.

10. The applicable patch selection method according to claim 6, wherein:
the information on released patches includes information on at least one of a patch number, release data, a package name, and a failure type for each of the patches.

11. A computer readable storage medium storing an applicable patch selection program that causes a computer to execute an operation, the operation comprising:

extracting first information on unapplied patches targeted to a package installed on an application target system from among information on released patches by comparing information on the installed package with information on packages fixed by the released patches;

extracting second information on unapplied patches in the application target system from among the extracted first information by comparing information on patches applied on the application target system with the extracted first information;

accepting a user's policy;

extracting third information on an unapplied patch which corresponds to the accepted user's policy and is targeted to packages installed on the application target system from among the extracted second information by comparing information on a use frequency for the packages installed on the application target system with policy data included information on a use frequency of package; and obtaining an unapplied patch corresponding to the extracted third information.

* * * * *